UNITED STATES PATENT OFFICE.

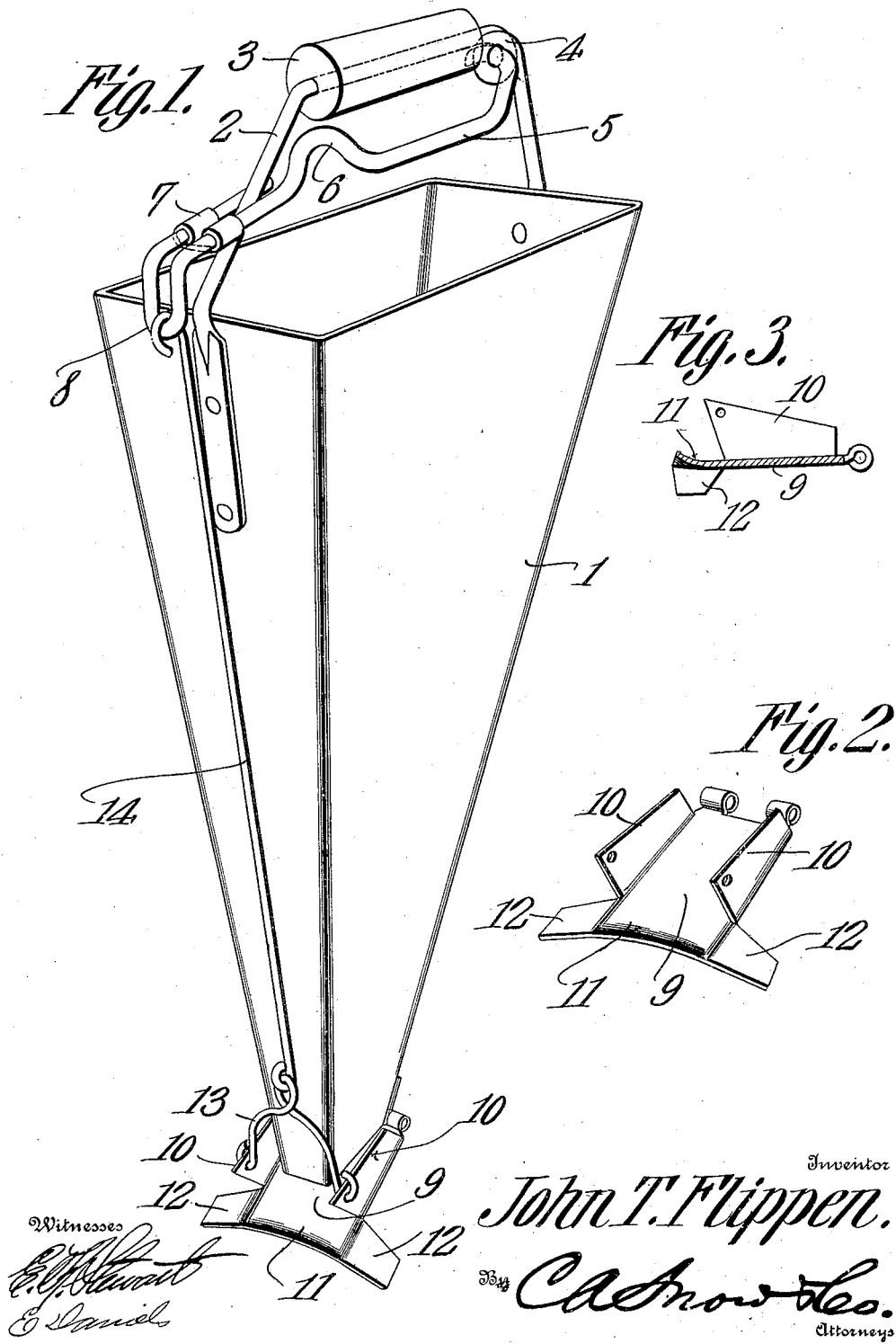

JOHN T. FLIPPEN, OF GREYSTONE, VIRGINIA.

HAND FERTILIZER-DROPPER.

No. 917,280.  Specification of Letters Patent.  Patented April 6, 1909.

Application filed July 27, 1908. Serial No. 445,481.

*To all whom it may concern:*

Be it known that I, JOHN T. FLIPPEN, a citizen of the United States, residing at Greystone, in the county of Henry and State of Virginia, have invented a new and useful Hand Fertilizer-Dropper, of which the following is a specification.

This invention relates to hand fertilizer droppers and it consists of a novel construction and arrangement of its parts hereinafter shown and described.

The present invention is an improvement upon the hand fertilizer dropper, for which Letters Patent were granted to me upon April 7th, 1908, No. 883,796.

The object of the invention is to provide a portable fertilizer dropper in the form of an elongated bucket or receptacle with a swinging valve of peculiar pattern or configuration pivotally mounted at its lower end and a lever fulcrumed to the bail handle of the bucket and being operatively connected with the said valve. Means is provided for limiting or regulating the swing of the said lever and the corresponding movement of the said valve. The valve is of such form as to permit a stream of fertilizer to flow from the lower end of the bucket and may be swung for the purpose of preventing the said material from choking in the end of the bucket. At the same time the valve is provided with an extended lip having downwardly inclined side portions and the said lip with the inclined portions is adapted to spread or separate the material as it is deposited upon the ground.

In the accompanying drawing;—Figure 1 is a perspective view of the dropper. Fig. 2 is a perspective view of the valve of the dropper detached. Fig. 3 is a longitudinal sectional view of the valve.

The dropper consists of the bucket 1 which is preferably pyramidal in shape and which is open at its upper and lower ends. The bail handle 2 is attached to the upper portion of the bucket 1 and is provided at its middle with a handle grip 3. The loop 4 is bent in toward the bail 5 at a point beyond one of the ends of the grip 3. The lever 5 is fulcrumed at its end to loop 4 and at its opposite end portion passes around the exterior part of the bail 2. The intermediate portion of the lever 5 lies under the handle grip 3 and is provided with a laterally distorted section 6. The extremity of the free end portion of the lever 5 is bent back substantially parallel with the part of the said lever 5 which lies transversely across the bail 2 and the stop 7 is adjustably mounted upon the parallel portions of the said lever 5. That part of the lever 5 which lies beyond the stop 7 is downwardly inclined or curved as at 8. The valve 9 is hinged to the lower end portion of the bucket 1 and is preferably made of metal the body portion of which is adapted to close against the lower edge of the bucket 1. The said valve 9 is provided at its sides with the upstanding flanges 10 which are adapted to over-lap the lower portions of the sides of the bucket 1. The said valve is provided with a lip 11 which projects beyond the ends of the flanges 10 and the said lip is provided at its opposite ends with the downwardly disposed or inclined section 12. The lower ends of the yoke 13 are pivotally connected with the flanges 10 of the valve 9 and the rod 14 is pivotally connected at its upper end with the downwardly curved portion 8 of the lever 5 and at its lower end with the intermediate portion of the yoke 13.

In operation the bucket 1 is filled with fertilizer and the operator carries the same along the row to be fertilized and at intervals swings the lever 5 which moves the valve 9 and prevents the fertilizer from packing at the lower end of the bucket. The stop 7 is first adjusted upon the lever 5 in order to regulate the swing or movement of the valve 9 whereby the quantity of fertilizer deposited is regulated. In case it should be desired to retain the fertilizer in the bucket without depositing the same the operator may pass a finger of his hand under the lever 5 and into the distorted section 6 thereof and swing the lever toward the handle grip 3 whereby the valve 9 will be closed against the lower end of the bucket 1 and the flow of fertilizer will be checked or interrupted. It will also be seen that when the valve 9 is in open position that the material may flow from the lower end of the bucket 1 out over the lip 11 of the valve 9 and as the material passes down along the sections 12 of the lip 11 it is spread as it is deposited upon the surface of the soil. Furthermore the flanges 10 which over-lap the side portions of the lower part of the bucket 1 will prevent the fertilizer from being blown laterally from the upper surface of the valve 9 but will direct the material toward the lip 11 and the inclined sections 12 thereof. It will also be seen that the parts are compactly arranged and of simple construction and that the device as an entirety is light and may be effectually handled and manipulated for the purposes intended.

Having described my invention what I claim as new and desire to secure by Letters Patent is:—

1. A fertilizer distributer consisting of a bucket open at its lower end, a valve hinged to the lower part of the bucket, a bail attached to the upper portion of the bucket and having a loop formed therein, a lever fulcrumed to said loop and being operatively connected with the valve.

2. A fertilizer distributer consisting of a bucket having an opening at its lower end, a valve hinged to the bucket and adapted to close against the lower end of the bucket, a bail attached to the upper portion of the bucket and having a loop formed therein, a lever fulcrumed to said loop and having at an intermediate point a laterally distorted section, and means operatively connecting the free end of said lever with the said valve.

3. A fertilizer distributer consisting of a bucket having an opening at the lower end a valve hinged to the bucket and adapted to close the opening at the lower end thereof, a lever fulcrumed at the upper portion of the bucket, a yoke pivotally connected with the valve, and a rod pivotally connected at one end with the lever and pivotally connected at its opposite end with the said yoke.

4. A fertilizer distributer consisting of a bucket having an opening at its lower end a valve hinged to the lower portion of the bucket and adapted to close the opening at the lower end thereof, a bail attached to the upper portion of the bucket, a lever fulcrumed to the said bail and having at its free end portion parallel sections which receive the bail between them, and means operatively connecting the free end portion of the said lever with the said valve.

5. A fertilizer distributer consisting of a bucket having an opening at its lower end, a valve hinged to the bucket and adapted to close against said opening, a bail attached to the upper portion of the bucket, a lever fulcrumed to the said bail and having at its free end portion parallel sections which receive the bail between them, an adjustable stop mounted upon the said parallel sections and adapted to have contact with the bail, and means operatively connecting the free end portion of the lever with the said valve.

6. A fertilizer distributer consisting of a bucket having an opening at its lower end, a valve hinged to the bucket and adapted to close against the opening thereof, a bail attached to the bucket, a lever fulcrumed to the said bail, and having at its free end portion parallel sections which receive the bail between them, an adjustable stop mounted upon the parallel sections of the lever, said lever being provided at its free extremity with a downwardly disposed portion, and means operatively connecting the downwardly disposed portion of the lever with the valve.

7. A fertilizer distributer consisting of a bucket having an opening at its lower end, a valve hinged to the lower portion of the bucket and adapted to close the said opening and having at its sides flanges adapted to overlap the sides of the bucket.

8. A fertilizer distributer consisting of a bucket having an opening at its lower end, a valve hinged to the lower part of the bucket and adapted to close against the opening thereof, said valve having at its sides flanges adapted to overlap the sides of the bucket, a yoke pivotally connected at its ends with said flanges, a rod pivoted to said yoke, a lever fulcrumed at the upper portion of the bucket and being pivotally connected with the upper end of said rod.

9. A fertilizer distributer consisting of a bucket having an opening at its lower end, a valve hinged to the lower portion of the bucket, and adapted to close against the opening thereof, means carried by the bucket for swinging the valve said valve having at its sides flanges adapted to overlap the sides of the bucket.

10. A fertilizer distributer consisting of a bucket having an opening at its lower end, a valve hinged to the bucket and adapted to close against the opening thereof, said valve having a projecting lip provided at its ends with downwardly inclined sections and means carried by the bucket for swinging the valve.

11. A fertilizer distributer consisting of a bucket having an opening at its lower end, a valve hinged to the lower part of the bucket and adapted to close against the opening thereof, said valve having at its sides flanges adapted to overlap the sides of the bucket, said valve being provided with a projecting lip having downwardly inclined sections and the means carried by the bucket for swinging the valve.

12. A fertilizer distributer consisting of a bucket having an opening at its lower end, a valve hinged to the bucket and adapted to close against the opening thereof, said valve having at its sides flanges adapted to overlap the sides of the bucket, said valve being provided with a projecting lip having downwardly inclined end sections, a yoke pivoted at its ends to the flanges of the valve, a lever fulcrumed at the upper portion of the bucket and a rod pivotally connecting the lever with said yoke.

In testimony that I claim the foregoing as my own, I have hereto affixed my signature in the presence of two witnesses.

JNO. T. FLIPPEN.

Witnesses:
J. L. NOELL,
E. F. GRAHAM.